United States Patent
Häggström et al.

(10) Patent No.: US 11,933,364 B2
(45) Date of Patent: Mar. 19, 2024

(54) SELF-POWERED SENSORIZED ROLLING ELEMENT

(71) Applicant: AKTIEBOLAGET SKF, Gothenburg (SE)

(72) Inventors: Fredrik Häggström, Luleå (SE); Andreas Clemens van der Ham, Utrecht (NL); Edin Spahic, Luleå (SE)

(73) Assignee: AKTIEBOLAGET SKF, Gothenburg (SE)

( * ) Notice: Subject to any disclaimer, the term of this patent is extended or adjusted under 35 U.S.C. 154(b) by 203 days.

(21) Appl. No.: 17/326,695

(22) Filed: May 21, 2021

(65) Prior Publication Data

US 2022/0373035 A1    Nov. 24, 2022

(51) Int. Cl.
*F16C 41/00* (2006.01)
*F16C 33/34* (2006.01)

(52) U.S. Cl.
CPC ............. *F16C 41/00* (2013.01); *F16C 33/34* (2013.01); *F16C 41/004* (2013.01); *F16C 41/008* (2013.01); *F16C 2202/36* (2013.01); *F16C 2233/00* (2013.01)

(58) Field of Classification Search
CPC ........ F16C 33/34; F16C 41/00; F16C 41/004; F16C 41/008; F16C 2233/00; G01L 5/0019

See application file for complete search history.

(56) References Cited

U.S. PATENT DOCUMENTS

| 5,033,877 | A  | * | 7/1991 | Bowen | F16C 33/34 |
|           |    |   |        |       | 384/567 |
| 10,570,956 | B2 | * | 2/2020 | van der Ham | G01L 5/0004 |
| 10,584,749 | B2 | * | 3/2020 | Carrerot | F16C 33/34 |
| 10,767,703 | B2 | * | 9/2020 | Den Haak | G01L 5/0009 |
| 2012/0020603 | A1 | * | 1/2012 | Stubenrauch | F16C 19/522 |
|           |    |   |        |       | 384/448 |
| 2012/0068575 | A1 |   | 3/2012 | Abildgaard | |
| 2014/0157880 | A1 | * | 6/2014 | Matsuda | F16C 41/008 |
|           |    |   |        |       | 73/112.01 |
| 2020/0271545 | A1 | * | 8/2020 | Lee | G01M 13/045 |
| 2021/0277954 | A1 | * | 9/2021 | Elfert | F16C 33/34 |

FOREIGN PATENT DOCUMENTS

DE    102006051642 A1    5/2008
DE    102011006907 B4    10/2012

* cited by examiner

*Primary Examiner* — Alan B Waits
(74) *Attorney, Agent, or Firm* — J-TEK LAW PLLC; Scott T. Wakeman; Mark A. Ussai (57) ABSTRACT

A sensorized rolling element for a bearing having inner and outer races and a plurality of rolling elements disposed between the inner and outer races and includes a rolling element body having an interior surface defining a cavity, the body being disposable between the inner race and the outer race. A wireless transmitter is disposed within the cavity of the rolling element body and a piezoelectric device is disposed within the cavity so as to contact the inner surface of the rolling element body. The piezoelectric device includes a body formed of piezoelectric material and at least two electrodes electrically coupling the piezoelectric body with the wireless transmitter. The piezoelectric device is configured to generate electrical charge for powering the transmitter when the rolling element body deflects under loading applied by the inner race and/or outer race and may also be used to detect loading on the rolling element body.

17 Claims, 11 Drawing Sheets

SELF-POWERED SENSORIZED ROLLING ELEMENT

BACKGROUND OF THE INVENTION

The present invention relates to bearings, and more particularly to sensorized rolling element bearings.

Rolling element bearings are well known and basically include inner and outer races and a plurality of rolling elements disposed between the races. Such bearings rotatably couple inner and outer members, for example an inner rotatable shaft and a fixed outer housing or casing, and transfers loading between the coupled members. In certain applications, a bearing may be provided with one or more sensors, such as strain gages mounted on the inner race and/or the outer race, to detect loading on the bearing or other properties of the bearing, such as temperature, vibration, etc.

SUMMARY OF THE INVENTION

In one aspect, the present invention is a sensorized rolling element for a bearing, the bearing having inner and outer races and a plurality of rolling elements disposed between the inner and outer races. The sensorized rolling element comprises a rolling element body having an interior surface defining a cavity, the body being disposable between the inner race and the outer race, a wireless transmitter disposed within the cavity of the rolling element body and a piezoelectric device disposed within the cavity so as to contact the inner surface of the rolling element body. The piezoelectric device includes a body formed of piezoelectric material and at least two electrodes electrically coupling the piezoelectric body with the wireless transmitter. The piezoelectric device is configured to generate electrical charge for powering the transmitter when the rolling element body deflects under loading applied by the inner race and/or the outer race.

In another aspect, the present invention is a method of forming a sensorized rolling element for a bearing including inner and outer races. The method comprises the steps of: providing a standard rolling element of a bearing, a piezoelectric device and a wireless transmitter; forming a cavity in the body of the rolling element, the cavity being defined by an interior surface; disposing the piezoelectric device within the cavity of the rolling element such that deflection of the rolling element deflects the piezoelectric device; and installing the wireless transmitter directly within the cavity of the rolling element body or within an interior chamber of the piezoelectric device.

In a further aspect, the present invention is again a sensorized rolling element for a bearing, the bearing having inner and outer races and a plurality of rolling elements disposed between the inner and outer races. The sensorized rolling element comprises a rolling element body having an interior surface defining a cavity, the body being disposable between the inner race and the outer race, a wireless transmitter disposed within the cavity of the rolling element body and a piezoelectric device disposed within the cavity so as to contact the inner surface of the rolling element body. The piezoelectric device includes a body formed of piezoelectric material and at least two electrodes electrically coupling the piezoelectric body with the wireless transmitter. The piezoelectric device is configured to generate electrical charge for powering the transmitter when the rolling element body deflects under loading applied by the inner race and/or the outer race and configured to sense loading on the rolling element body. Further, the piezoelectric material body is either formed as a tube having an inner surface defining a housing chamber for containing the transmitter or as an elongated body having opposing axial ends each in contact with the interior surface of the rolling element.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-11 a sensorized rolling element 10 for a bearing 1 having inner and outer races 2, 3, respectively, and a plurality of rolling elements 4 disposed between the inner and outer races 2, 3. The sensorized rolling element 10 basically comprises a rolling element body 12 having an interior surface 13 defining a cavity 14 and at least a piezoelectric device 16 and a wireless transmitter 18 disposed within the cavity 14. More specifically, the rolling element body 12 is disposable between the bearing inner and outer races 2, 3 and is preferably a standard or conventional bearing rolling element of any appropriate type. Although the body 12 is depicted and described herein as a cylindrical roller for purposes of convenience of illustration only, the rolling element body 12 may alternatively be a ball, a tapered roller, a needle, a toroidal, a spherical roller or any other known type of bearing rolling element.

Figure 1:
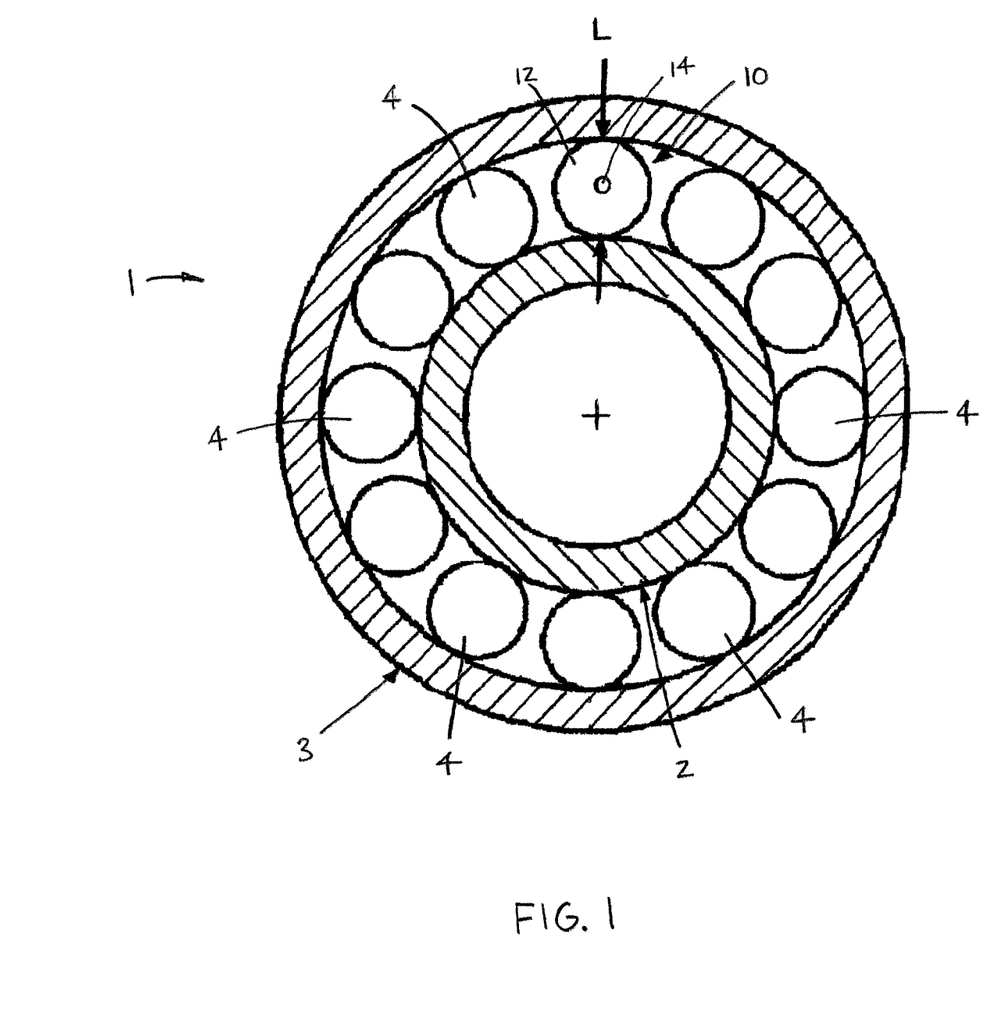
FIG. 1 is a radial cross-section of a bearing with a sensorized rolling element in accordance with the present invention.
Figure 2:
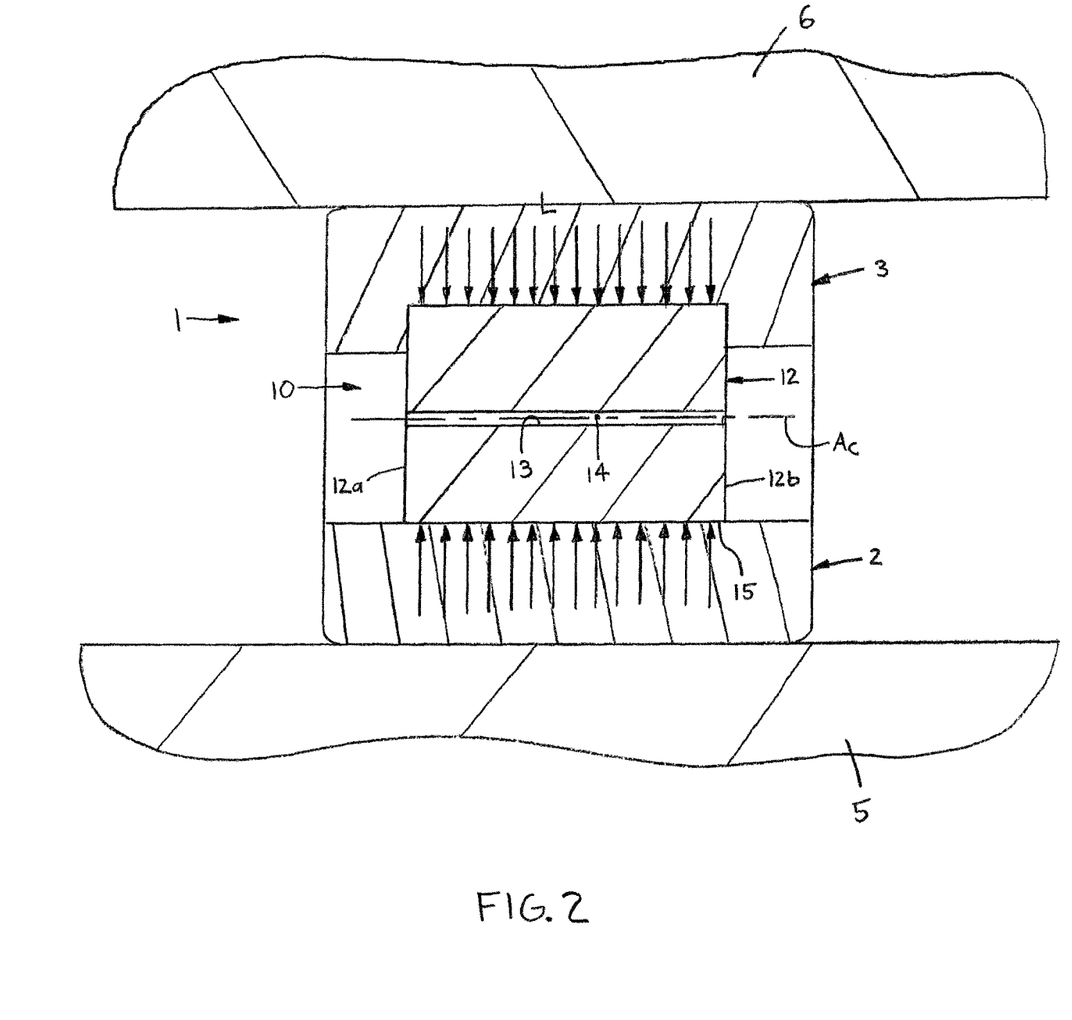
FIG. 2 is an enlarged, broken-away axial cross section of an upper portion of a bearing.

Most preferably, the rolling element body 12 is a commercially available rolling element formed by standard manufacturing techniques that has been modified to include the cavity 14, as described in further detail below, and may be formed of bearing steel (e.g., AISI 52100) or an appropriate ceramic. With the preferred cylindrical roller, the rolling element body 12 has a central axis $A_C$, a cylindrical outer surface 15 and opposing axial ends 12a, 12b, and the interior surface 13 is preferably cylindrical and extends axially between the first and second axial ends 12a, 12b. Typically, with such a cylindrical roller, the loading L applied to the rolling element body 12 is distributed generally equally along the central axis $A_C$, as shown in FIG. 2. Also, the cavity 14 is preferably formed relatively "small" in comparison to the size of the rolling element body 12, most preferably such that a ratio of a value of the rolling element body outside diameter $OD_B$ to a value of the inner surface inside diameter $ID_C$ is greater than eight, or $OD_B/ID_C > 8$.

As a result, the rolling element body 12 will react to loading in a manner that is substantially identical to the behavior of a conventional rolling element under the same loading, such that the loading detected by the piezoelectric device 16, or a separate sensor 26 in certain constructions, is a more accurate measurement of loading in comparison with a construction in which the interior cavity occupies a substantial portion of the volume of the rolling element body 12. In other words, if the cavity 14 occupies a substantial portion of the volume of the body 12, the "thinner" body 12 may deflect to a greater extent under a given amount of loading in comparison with a conventional rolling element subjected to the same loading L, resulting in loading measurements that are inaccurate.

Further, the piezoelectric device 16 is disposed or installed within the cavity 14 so as to contact the interior surface 13 of the rolling element body 12 at two or more points on the surface 13 as described below. The piezoelectric device 16 basically includes a body 20 formed of piezoelectric material, which may be any appropriate crystalline or ceramic material, and at least two electrodes 22 electrically coupling the piezoelectric body 20 with the wireless transmitter 18. The piezoelectric device 16 is configured to generate electrical charge for powering at least the transmitter 18 when the rolling element body 12 deflects under loading L applied by the inner race 2 and/or the outer race 3.

Figure 7:
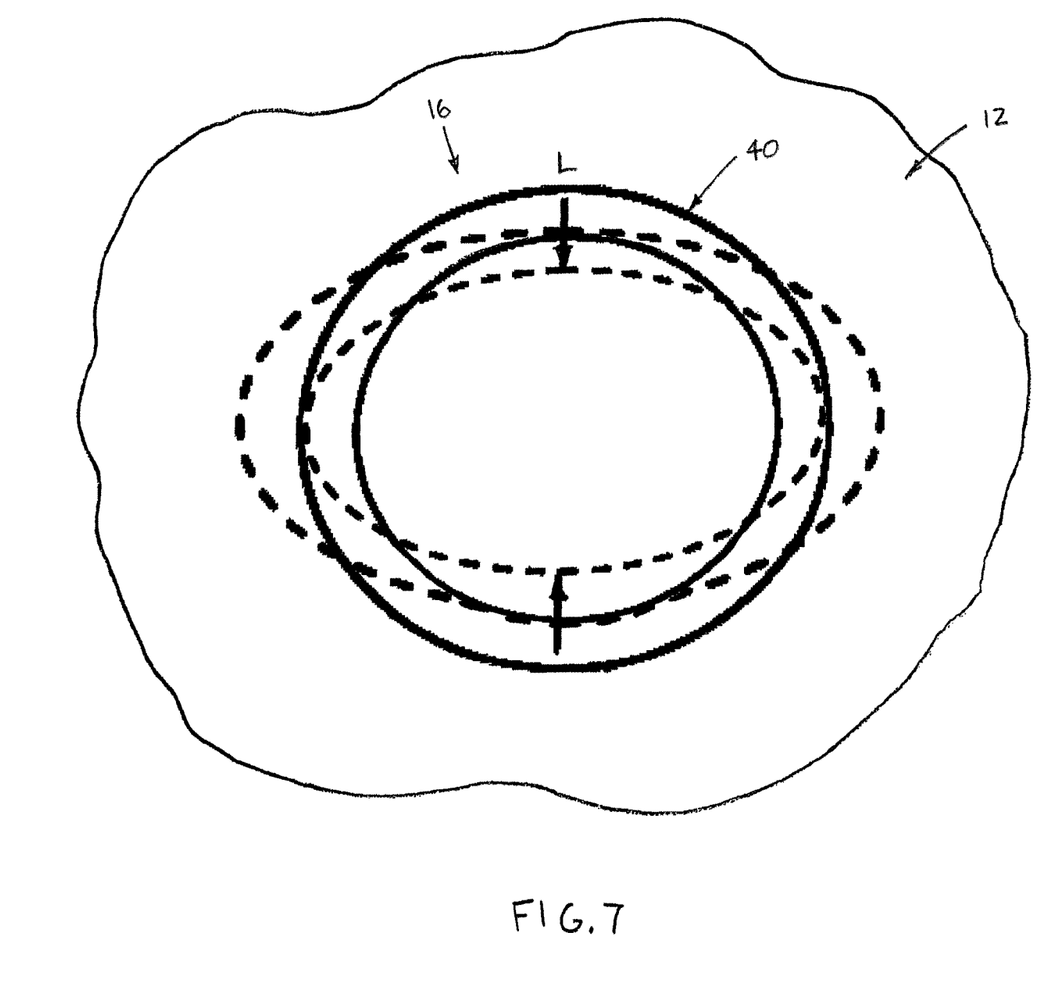
FIG. 7 is another enlarged, broken-away view of a central portion of FIG. 4, showing the deflection of a cavity of the rolling element under loading, as well as corresponding deflection of the piezoelectric device.

More specifically, as is well known in the electronics arts, a piezoelectrical material generates electric charge or creates a voltage when extended and/or compressed under an applied mechanical force(s). With the present piezoelectric device 16, electric charge/voltage is generated when the device 16, which is in contact with the bearing interior surface 13, is deflected, compressed and/or extended by corresponding strain on the rolling element body 12 under loading transferred to the sensorized element 10 through the races 2, 3 from the device(s) supported by the bearing 1 (e.g., a rotating shaft 5 within a housing 6 of a machine, etc.). As shown in FIG. 7, loading L on a bearing rolling element typically causes the upper and lower sections of the rolling element body 12 in contact with the races 2, 3 to become compressed and the "sides" between the upper and lower sections to become extended or expanded in tension, such that the body 12 and the cavity 13, and in the construction of the piezoelectric device including a body tube 40 as described below, to become generally oval-shaped.

Figure 3:
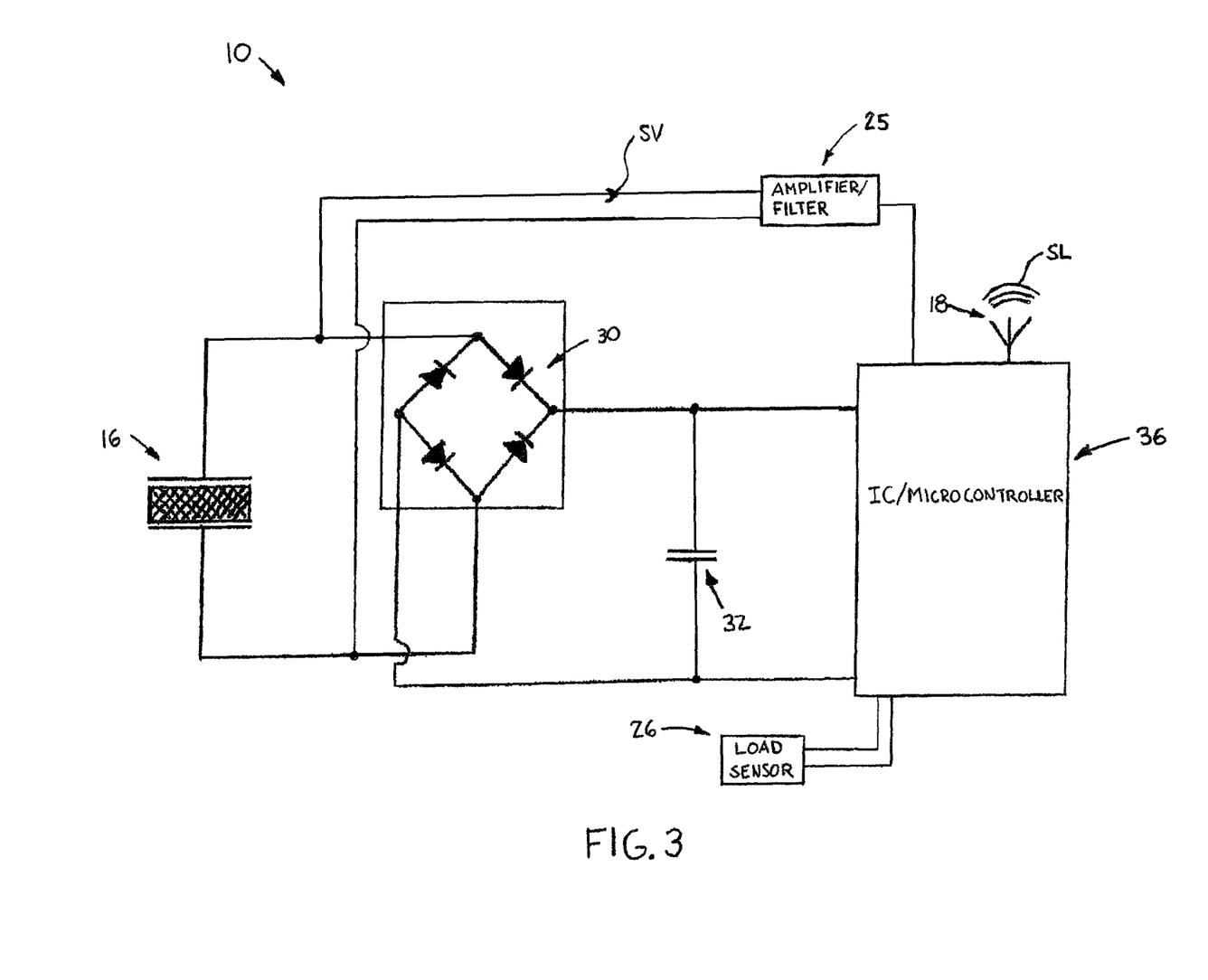
FIG. 3 is schematic view of exemplary electronic components of the sensorized rolling element.

In certain applications, the piezoelectric device 16 also generates a voltage signal SV proportional to loading L on the rolling element body 12, in addition to electrically powering the transmitter 18 and preferably other electronic components as described below, as indicated in FIG. 3. In these applications, the rolling element 10 preferably further includes an amplifier/filter 25 electrically coupled between the piezoelectric device 16 and the transmitter 18, the wireless transmitter 18 then transmitting an amplified/filtered signal SL corresponding to the voltage signal SV from the piezoelectric device 16, such that an external device (e.g., controller, computer, etc.) receives the load signal SL and can appropriately utilize the information on bearing loading. In other applications, the sensorized rolling element 10 further comprises at least one sensor 26, preferably at least a load sensor, electrically coupled and with the piezoelectric device 16 and with the wireless transmitter 18, as depicted in FIG. 3. The sensor 26 is configured to sense a property of the rolling element body 12, such as loading, temperature, velocity, acceleration, etc., and the piezoelectric device 16 is configured to electrically power the sensor 26. Therefore, the piezoelectric device 16 may be used solely as an electric generator to power the sensor 26, the transmitter 18 and the associated electronic components, or may be used as both a load sensor and as a generator. Further, the sensor 26 may be provided integrated with the wireless transmitter 18, although both components, particularly the transmitter 18 may be provided by a discrete component that is mounted within the cavity 14 and connected with the piezoelectric device 16 by any appropriate means.

Referring particularly to FIG. 3, as mentioned above, the sensorized rolling element 10 preferably further comprises at least certain electronic components for converting and storing the charge/voltage generated by the piezoelectric device 16. Specifically, the rolling element 10 may include a rectifier or active rectifying circuit 30 electrically coupled with the electrodes 22 of the piezoelectric device 16 and configured to convert alternating current ("AC") generated by the piezoelectric device 16 to direct current ("DC"). That is, as the rolling element body 12 rolls within the races 2, 3, sections of the body 12 directly under loading are compressed while other sections of the body 12 become expanded or extended, as best shown in FIG. 7, which causes the piezoelectric device 16 in contact with the rolling element interior surface 13 to similarly deflect in alternating directions and generate voltage in a continuously reversing direction, as described below. As such, the rectifier 30 converts the resulting alternating current (AC) to direct current (DC) usable by the wireless transmitter 18, the sensor(s) 26 and any other desired electronic components.

Further, as the piezoelectric device 16 may generate more electric power than is required to power the electronic components, the rolling element device 10 preferably also comprises some means for storing charge, such as a capacitor, a super capacitor or a battery. The capacitor, the supercapacitor or the battery, the particular component being utilized indicated by reference numeral 32, is electrically connected with the rectifier 30 and configured to store charge generated by the piezoelectric device 16. As such, the particular storage means 32 enables the sensor(s) 26 and the transmitter 18 to function when the rolling element body 12 is static or stationary, i.e., the bearing 1 is non-rotational, or more importantly, when the bearing 1 "restarts" from a static state.

Furthermore, the various electronic components of the sensorized rolling element 10 are preferably provided on a printed circuit board ("PCB") or as components of a specially designed integrated circuit ("IC"), either being indicated by reference numeral 34 in the drawing figures. Preferably, when the rolling element device 10 includes one or more additional sensors 26, storage means 32 and other circuit components, the wireless transmitter 18 is preferably provided as part of an embedded system 36, which is further configured to provide energy storage, signal processing, data storage, and/or inertial measurement. Such an embedded system 36 is part of an IC 34, but all of these functions may alternatively be provided by separate electronic components mounted on a PCB 34 along with other electronic components.

Figure 4:
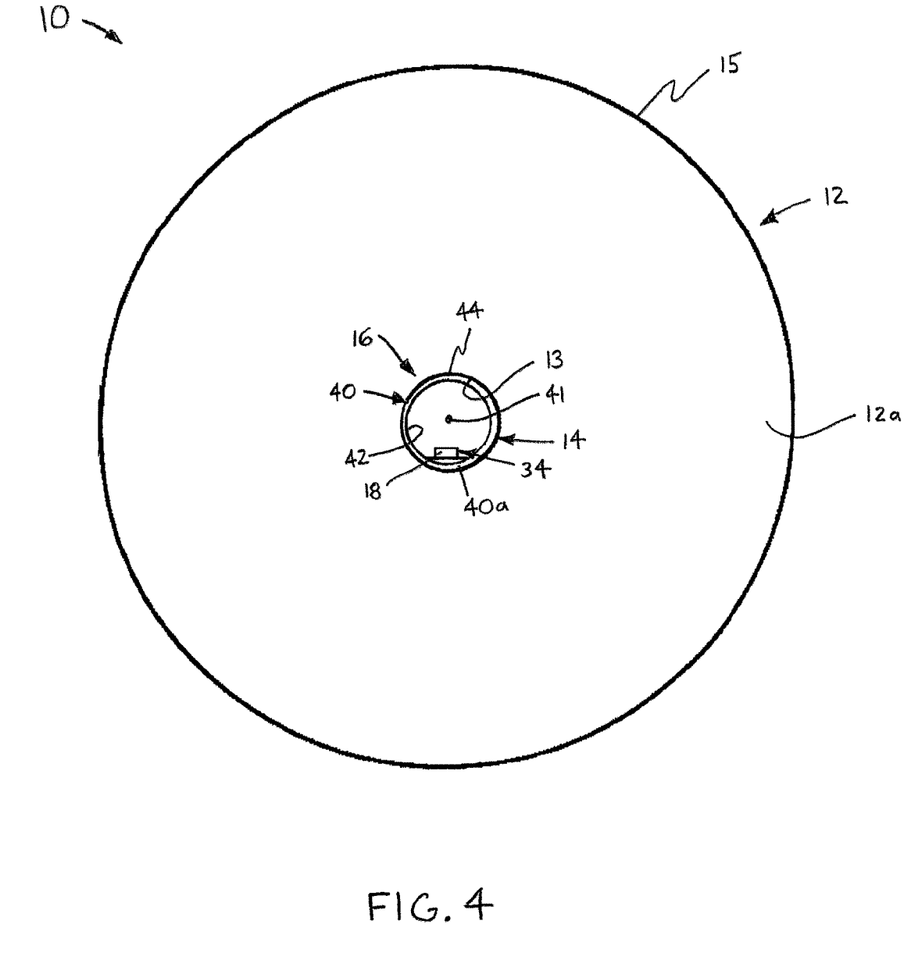
FIG. 4 is a side view of the sensorized rolling element with a piezoelectric device in accordance with a first construction.
Figure 5:
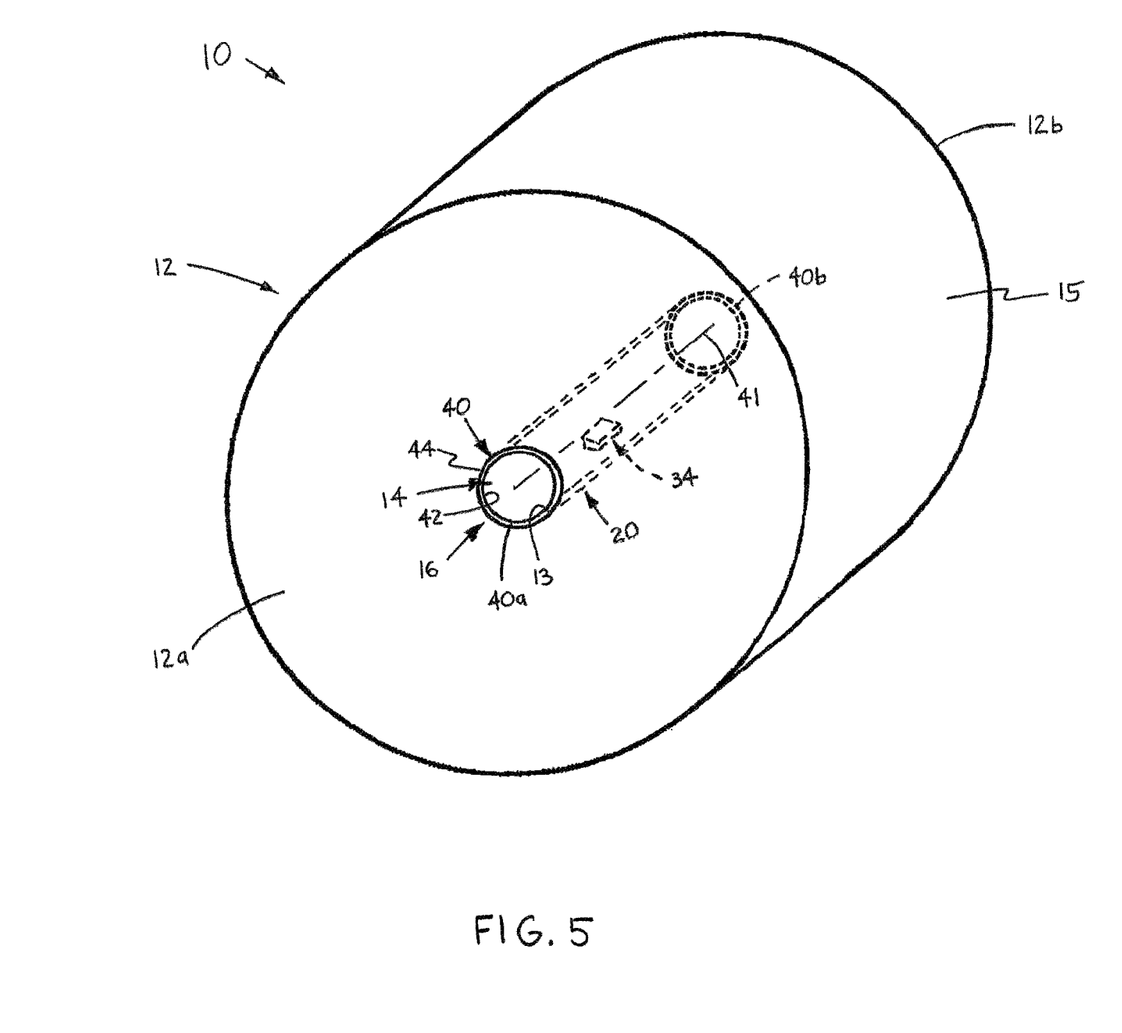
FIG. 5 is a perspective view of the rolling element of FIG. 4.
Figure 6:
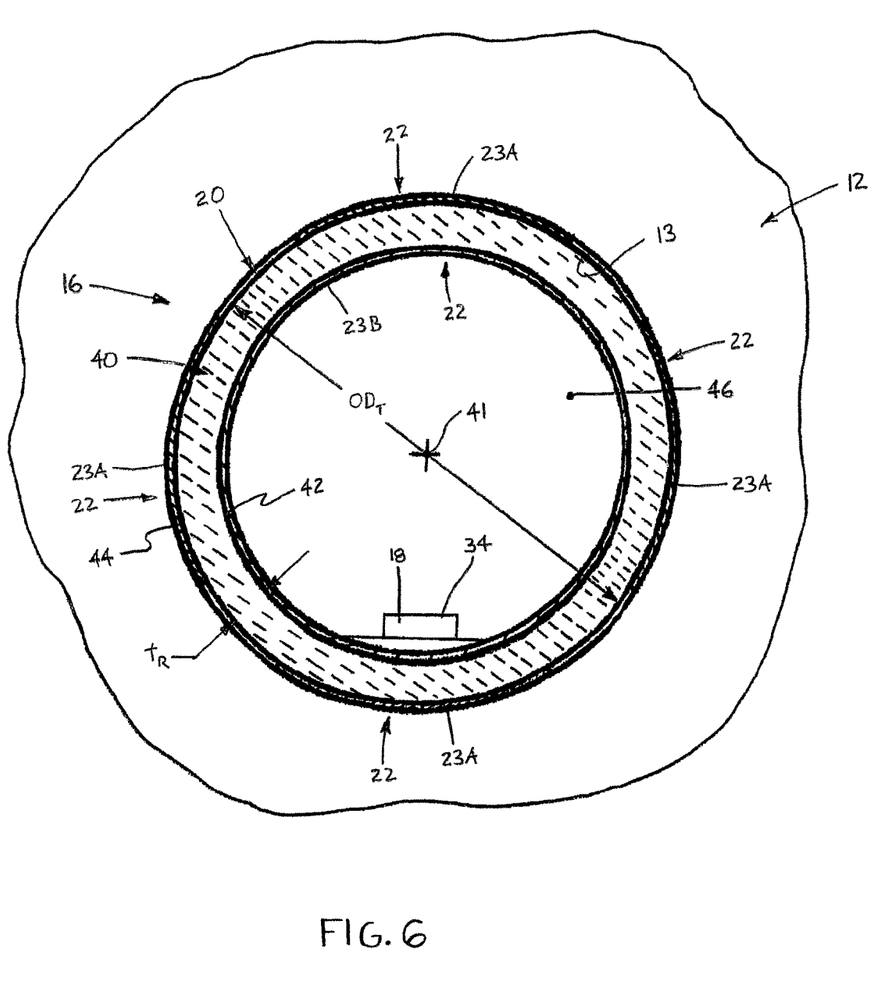
FIG. 6 is an enlarged, broken-away view of a central portion of FIG. 4.

Referring to FIGS. 4-6, in one preferred construction, which is particularly suitable when the rolling element body 12 is formed as a cylindrical roller, the piezoelectric body 16 is formed as a circular cylindrical tube 40. Preferably, the piezoelectric body tube 40 is a commercially available device, such as for example, a piezo tube actuator manufactured by PI Ceramic GmbH of Lederhose, Germany, but may alternatively be a specially manufactured apparatus. In either case, the piezoelectric tube 40 has a central axis 41, opposing axial ends 40a, 40b, an inner circumferential surface 42 and an outer circumferential surface 44. With such a construction, the interior surface 13 of the rolling element body 12 is a circular cylindrical surface that extends through the body 12 between the body axial ends 12a, 12b. The outer circumferential surface 44 of the piezoelectric tube 40 is disposed against the circular cylindrical interior surface 13 of the rolling element body 12, and is fixedly attached thereto by adhesives or a friction fit.

Further, the inner surface 42 of the tube 40 defines a housing chamber 46 sized to contain the various electronic components, such that the transmitter 18, the sensor(s) 26, the rectifier 30, the storage means 32, etc. are disposed within the housing chamber 46, preferably on the PCB or as part of the IC 34. To ensure that the housing chamber 46 has sufficient volume or space for containing any desired electronic components, the piezoelectric tube 40 is formed "truly" tubular as opposed to generally annular. That is, the tube 40 has a substantially greater outside diameter $OD_T$ in comparison to the radial thickness $t_R$ of the tube 40, the thickness $t_R$ being defined as the radial distance between the inner circumferential surface 42 and the outer circumferential surface 44, as indicated in FIG. 6. Preferably, the piezoelectric body tube 40 is formed or sized such that a ratio of a value of the tube outside diameter $OD_T$ to a value of the tube radial thickness $t_R$ is greater than eight or $OD_T/t_R > 8$.

Furthermore, the piezoelectric body tube 40 is preferably configured to sense loading L at different points about the circumference of the rolling element body 12. Specifically, the piezoelectric device 16 with the tubular body 40 has at least two and preferably four outer electrodes 23A attached to the body outer circumferential surface 44 and a single inner electrode 23B attached to the body inner circumferential surface 42, although the device 16 may have a single outer electrode 23A and at least two inner electrodes 23B, as discussed in further detail below. Each outer electrode 23A is formed as a thin arcuate plate 50 extending between the axial ends 40a, 40b of the body 40 and spaced circumferentially about the central axis 41. Further, the inner electrode 23B is formed as a tubular sleeve 52 disposed within and attached to the body inner surface 42.

With this structure, deflection within each quadrant of the tubular body 40 generates a voltage between the common inner electrode 23B and the specific outer electrode 23A disposed about the particular quadrant of the body 40. Thereby, when the piezoelectric device 16 is also used to detect loading (i.e., in addition to generating electrical power), a voltage signal from each outer electrode 23A can be used to detect the magnitude and direction (i.e., tension or compression) of loading L within each quadrant of the rolling element body 12. Although four outer electrodes 23A and a single inner electrode 23A are presently preferred, the piezoelectric body tube 40 may be provided with any desired number of outer and inner of electrodes 23A, 23B, respectively.

Figure 8:
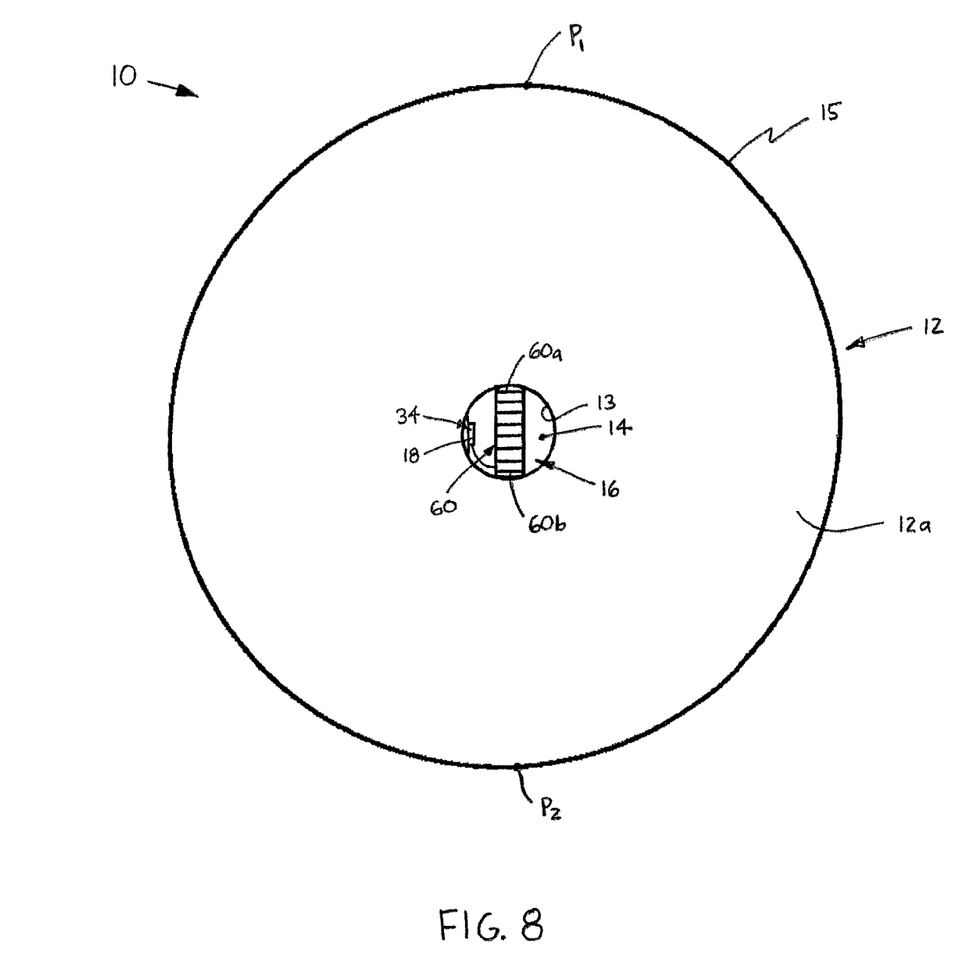
FIG. 8 is a side view of the sensorized rolling element with a piezoelectric device in accordance with a second construction.
Figure 9:
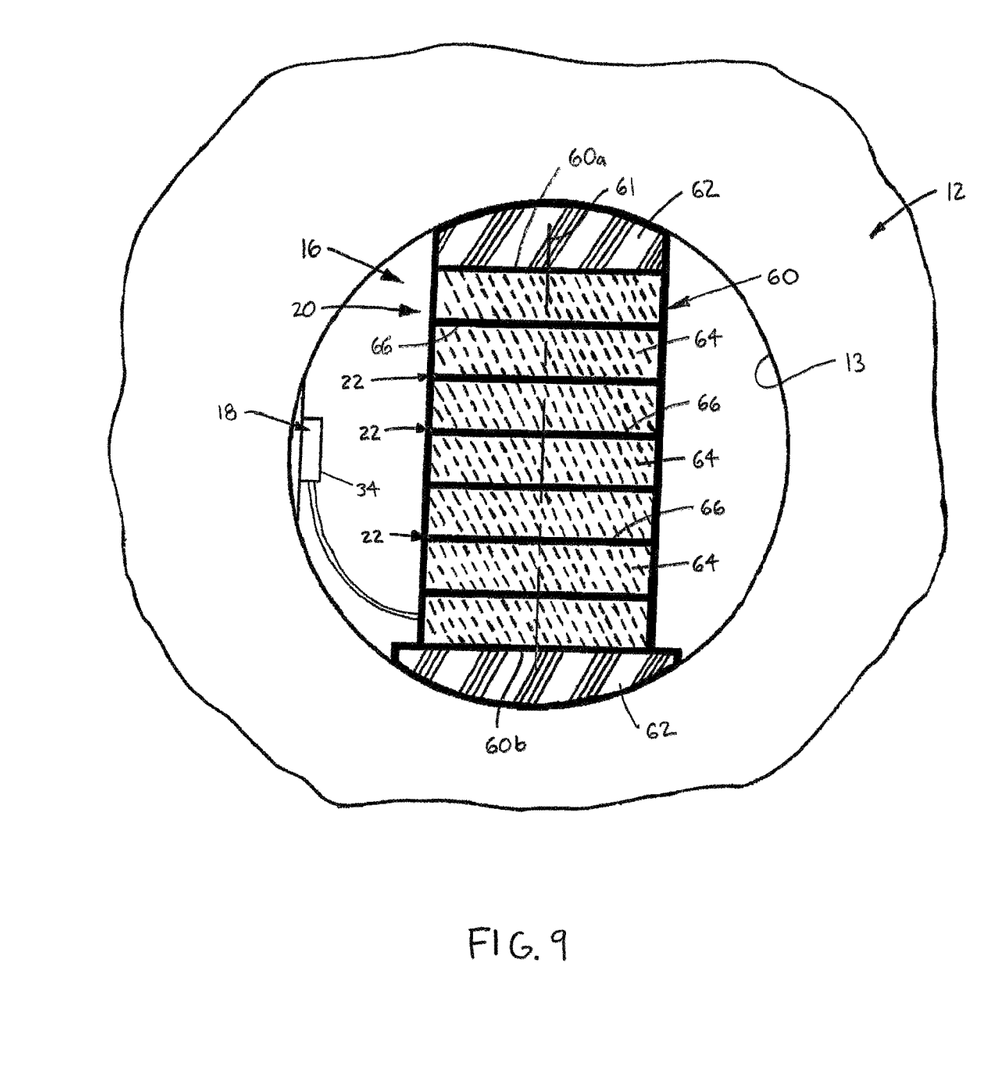
FIG. 9 is an enlarged, broken-away view of a central portion of FIG. 8.
Figure 10:
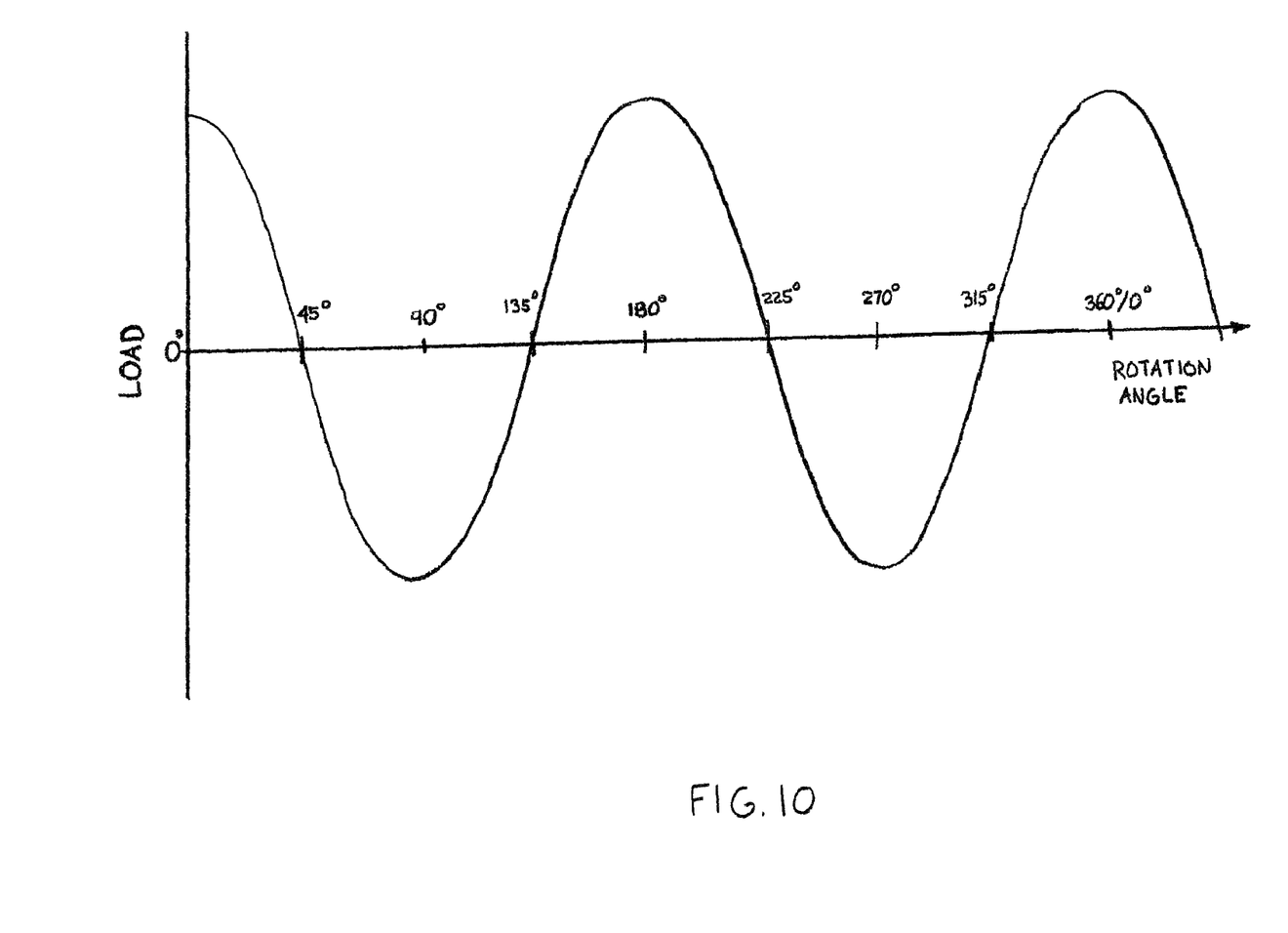
FIG. 10 is graph illustrating the variation of loading on a point on the rolling element during rolling.
Figure 11:
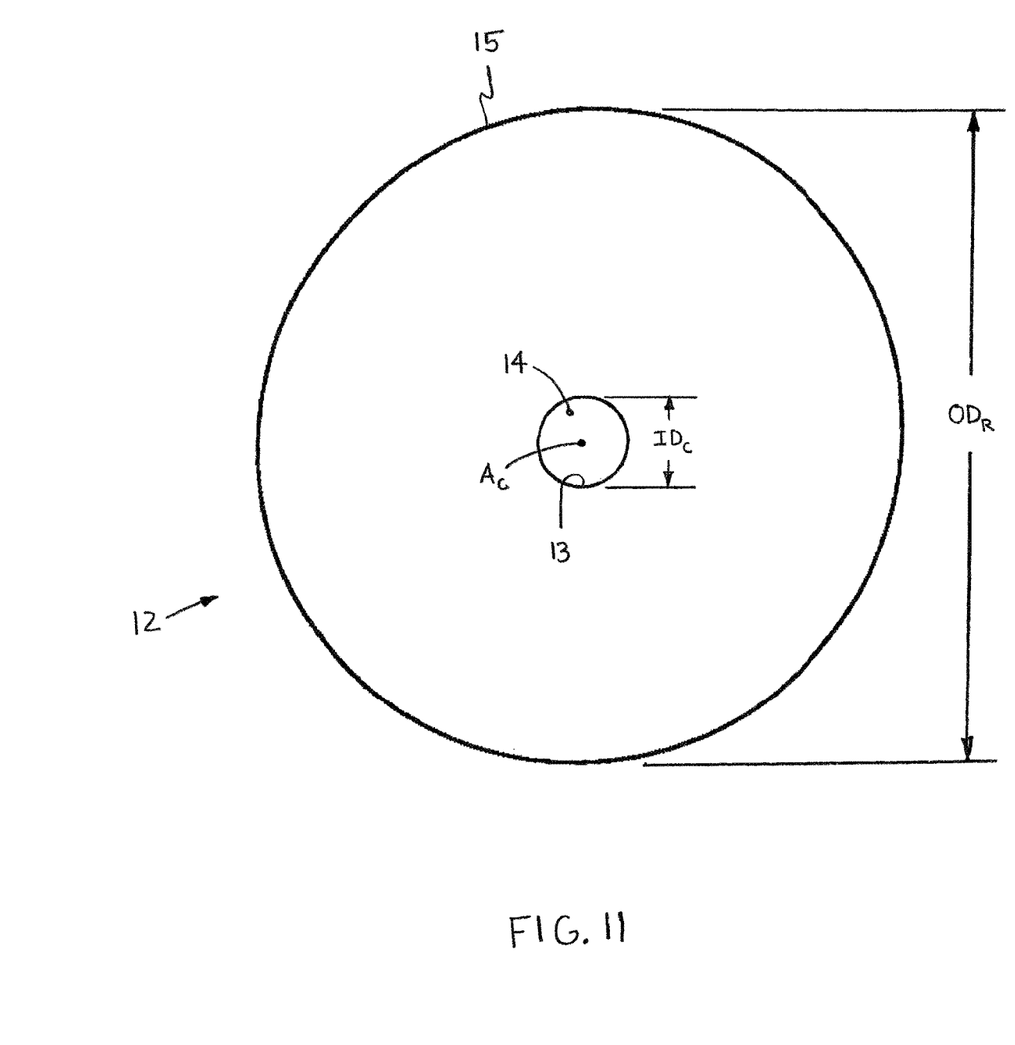
FIG. 11 is a side view of a rolling element body modified from a conventional rolling element.

Referring to FIGS. 8 and 9, in another preferred construction, the piezoelectric body 20 is formed as an elongated body 60 extending along a central axis 61 and having opposing first and second axial ends 60a, 60b spaced apart along the axis 61. As used herein, the term "elongated" is meant to indicate a body having a substantially greater length in comparison with the width and depth of the body. The elongated body 60 is disposed within the cavity 14 of the rolling element body 12 such that each one of the axial ends 60a, 60b is coupled with the interior surface 13 of the rolling element body 12 directly or, preferably, through a damper 62 disposed between the one axial end 60a or 60b and the interior surface 13 of the rolling element body 12. Such a damper 62 may be an elastomeric body as depicted or may be provided by a spring, either separately or in combination with an elastomeric pad.

Preferably, the elongated body 60 is a "piezo stack" fabricated of a plurality of plates 64 formed of piezoelectric material and spaced along the central axis 61 and a plurality of electrode plates 66, which are all preferably enclosed within a case (not shown). The electrode plates 66 are arranged alternating with the piezoelectric plates 64 such that a separate one of the plurality of electrodes 66 is disposed between each pair of adjacent plates 64. Preferably, the piezoelectric elongated body 60 is provided by a commercially available device, such as for example, a PICA stack actuator manufactured by PI Ceramic, but may alternatively be a specially manufactured apparatus. Further, with the elongated body 60, the electronic components of the sensorized rolling element 10, such as the transmitter 18, the rectifier 30, the capacitor/supercapacitor/battery 32, etc. are disposed within the cavity 14 of the rolling element body 12 proximal to the piezoelectric device 16.

As indicated in FIG. 8, with the elongated body 60, the piezoelectric device 16 is configured to sense loading generally at two discrete points $P_1$, $P_2$ about the circumference of the rolling element body 12 which each correspond to the area of contact between each end 60a, 60b of the body 60 and the body interior surface 13. As such, the two points $P_1$, $P_2$, are spaced apart about the circumference of the rolling element body 12 by one hundred eighty degrees (180°) and such points $P_1$, $P_2$ are subjected to the loading of the same magnitude and "direction" (i.e., tension or compression). Therefore, when the piezoelectric device 16 is used to detect loading, the elongated body 60 is continuously subjected to alternating compression and tension as the rolling element body 12 rolls between the races 2, 3, allowing the voltage generated by the body 60 to indicate the state of loading on the rolling element 10.

With either preferred piezoelectric device 16, the sensorized rolling element 10 is basically formed or fabricated as follows. First, a standard, commercially available rolling element of any appropriate type (cylindrical roller, ball, needle, etc.) is fabricated or provided. The rolling element body 12 is then modified by any appropriate means to form the cavity 14, such as by drilling, boring, laser cutting, etc., so that the interior surface 13 is formed of any appropriate shape, for example circular cylindrical, spherical, etc. Thereafter, the piezoelectric device 16 and associated electronic components, preferably provided as an embedded system 36 as part of an IC 34, or on a PCB, are installed within the cavity 14. Specifically, the piezoelectric device 16, either provided as the tubular body 40 or as the elongated "axial stack" 60, is positioned within the cavity 14 such that deflection of the rolling element body 12 deflects the piezoelectric device 16. Then, the electronic components such as the transmitter 18, rectifier 30, capacitor/battery 32, etc. are installed and electrically coupled with the piezoelectric device 16 by any appropriate means. The sensorized rolling element 10 is then installable within a bearing 1 and usable to monitor bearing performance.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A sensorized rolling element for a bearing, the bearing having inner and outer races and a plurality of rolling elements disposed between the inner and outer races, the sensorized rolling element comprising;
a rolling element body having an interior surface defining a cavity, the body being disposable between the inner race and the outer race;
a wireless transmitter disposed within the cavity of the rolling element body; and
a piezoelectric device disposed within the cavity so as to contact the inner surface of the rolling element body, the piezoelectric device including a body formed of piezoelectric material and at least two electrodes electrically coupling the piezoelectric body with the wireless transmitter, the piezoelectric device being configured to generate electrical charge for powering the transmitter when the rolling element body deflects under loading applied by at least one of the inner race and the outer race and configured to sense loading on the rolling element body, the piezoelectric material body being formed as a tube having an inner surface defining a housing chamber for containing the transmitter or as an elongated body having opposing axial ends each in contact with the interior surface of the rolling element.

2. The sensorized rolling element as recited in claim 1 wherein the piezoelectric device generates a voltage signal proportional to loading on the rolling element body and the wireless transmitter transmits a signal corresponding to the voltage signal from the piezoelectric device.

3. The sensorized rolling element as recited in claim 1 further comprising at least one sensor electrically coupled with the transmitter and with the piezoelectric device, the sensor being configured to sense a property of the rolling element body and the piezoelectric device being configured to electrically power the sensor.

4. The sensorized rolling element as recited in claim 1 wherein the wireless transmitter is integrated with a sensor for sensing a property of the rolling element body.

5. The sensorized rolling element as recited in claim 1 further comprising:
a rectifier electrically coupled with the electrodes of the piezoelectric device and configured to convert alternating current generated by the piezoelectric device to direct current; and
at least one of a capacitor, a supercapacitor and a battery electrically connected with the rectifier and configured to store charge generated by the piezoelectric device.

6. The sensorized rolling element as recited in claim 1 wherein:
the inner surface of the rolling element body is a circular cylindrical surface; and
the piezoelectric tube has an outer circumferential surface disposed against the circular cylindrical inner surface of the rolling element body.

7. The sensorized rolling element as recited in claim 6 further comprising at least one of a rectifier, a battery, a capacitor and a load sensor disposed within the housing chamber of the piezoelectric body tube.

8. The sensorized rolling element as recited in claim 6 wherein the rolling element body has a circumference and the piezoelectric body tube is configured to sense loading at different points about the circumference of the rolling element body.

9. The sensorized rolling element as recited in claim 6 wherein at least one of:
the piezoelectric body tube has an outside diameter and a radial thickness defined between the inner circumferential surface and the outer circumferential surface, a ratio of a value of the tube outside diameter to a value of the tube radial thickness being greater than eight; and
the rolling element body has an outside diameter, the interior surface of the rolling element body has an inside diameter, and a ratio of a value of the rolling element body outside diameter to a value of the interior surface inside diameter is greater than eight.

10. The sensorized rolling element as recited in claim 1 wherein the piezoelectric body is elongated along a central axis perpendicular to an axis of rotation of the rolling element body and has the opposing axial ends are first and second axial ends spaced apart along the central axis, each one of the first and second axial ends of the elongated body is coupled with the inner surface of the rolling element body directly or through a damper disposed between the one axial end and the inner surface of the rolling element body.

11. The sensorized rolling element as recited in claim 10 wherein the piezoelectric elongated body is formed of a plurality of plates formed of piezoelectric material and spaced along the central axis and a plurality of electrodes arranged such that a separate one of the plurality of electrodes is disposed between each pair of adjacent plates.

12. The sensorized rolling element as recited in claim 10 further comprising at least one of a rectifier, a capacitor, a supercapacitor, a battery and a sensor for sensing a property of the rolling element body each disposed within the cavity of the rolling element body.

13. The sensorized rolling element as recited in claim 10 wherein the rolling element body has a circumference and the piezoelectric elongated body is configured to sense loading at two discrete points about the circumference of the rolling element body, the two points being spaced apart about the circumference of the rolling element body by one hundred eighty degrees.

14. A method of forming a sensorized rolling element for a bearing including inner and outer races, the method comprising the steps of:
providing a rolling element of a bearing, the rolling element having a solid, one-piece body with a central axis of rotation, a piezoelectric device and a wireless transmitter;
forming a cavity in the solid body of the rolling element, the cavity being defined by an interior surface and centered around the central axis of rotation;
disposing the piezoelectric device within the cavity of the rolling element such that deflection of the rolling element deflects the piezoelectric device; and
installing the wireless transmitter directly within the cavity of the rolling element body or within an interior chamber of the piezoelectric device;
wherein:
the step of providing a piezoelectric device includes providing a piezoelectric tube having an outer circumferential surface and an inner circumferential surface defining an interior chamber;
the step of forming the cavity in the rolling element body includes forming the inner surface of the cavity as a circular cylindrical surface;
the step of disposing the piezoelectric device within the cavity of the rolling element includes attaching the outer circumferential surface of the tube to the inner surface of the cavity of the rolling element body; and
the step of installing the wireless transmitter includes disposing the wireless transmitter within the interior chamber of the tube of the piezoelectric device.

15. The method as recited in claim 14 further comprising the steps of:
providing a rectifier and at least one of a capacitor, a supercapacitor and a battery; and
installing the rectifier and the at least one of the capacitor, supercapacitor and the battery within the interior chamber of the tube of the piezoelectric device and electrically coupling the rectifier with the tube and electrically coupling the at least one of the capacitor, supercapacitor and the battery with the rectifier.

16. A method of forming a sensorized rolling element for a bearing including inner and outer races, the method comprising the steps of:
providing a rolling element of a bearing, the rolling element having a solid, one-piece body with a central axis of rotation, a piezoelectric device and a wireless transmitter;
forming a cavity in the solid body of the rolling element, the cavity being defined by an interior surface and centered around the central axis of rotation;
disposing the piezoelectric device within the cavity of the rolling element such that deflection of the rolling element deflects the piezoelectric device; and
installing the wireless transmitter directly within the cavity of the rolling element body or within an interior chamber of the piezoelectric device;
wherein:
the step of providing a piezoelectric device includes providing a piezoelectric elongated body having two opposing axial ends; and
the step of disposing the piezoelectric device within the cavity of the rolling element includes attaching each axial end of the piezoelectric bar to a separate one of two points on the inner surface of the cavity of the rolling element body.

17. The method as recited in claim 16 further comprising the steps of:
providing a rectifier and at least one of a capacitor, a supercapacitor and a battery; and
installing the rectifier and the at least one of the capacitor, supercapacitor and the battery within the cavity of the rolling element body and electrically coupling the rectifier with the piezoelectric elongated body and electrically coupling the at least one of the capacitor, supercapacitor and the battery with the rectifier.

* * * * *